United States Patent [19]

Hatta et al.

[11] Patent Number: 5,003,842
[45] Date of Patent: Apr. 2, 1991

[54] CONTROL DEVICE FOR AUTOMATIC TRANSMISSION GEAR SYSTEM

[75] Inventors: Katuhiro Hatta; Takeo Hiramatsu; Bonnosuke Takamiya, all of Kyoto, Japan

[73] Assignee: Mitsubishi Jidoshal Kogyo Kabushiki Kaisha, Tokyo, Japan

[21] Appl. No.: 590,601

[22] Filed: Sep. 25, 1990

Related U.S. Application Data

[63] Continuation of Ser. No. 463,935, Jan. 8, 1990, abandoned, which is a continuation of Ser. No. 267,667, Nov. 4, 1988, abandoned, which is a continuation of Ser. No. 81,586, Aug. 3, 1987, abandoned, which is a continuation of Ser. No. 912,686, Sep. 26, 1986, abandoned, which is a continuation of Ser. No. 530,642, Sep. 9, 1983, abandoned.

[30] Foreign Application Priority Data

Sep. 10, 1982 [JP] Japan .................................. 157644

[51] Int. Cl.5 .............................................. B60K 41/06
[52] U.S. Cl. ...................................... 74/867; 188/1.11
[58] Field of Search ................ 74/866, 867, 868, 869; 188/1.11

[56] References Cited

U.S. PATENT DOCUMENTS

| | | | |
|---|---|---|---|
| 3,956,947 | 5/1976 | Leising et al. | 74/866 |
| 4,082,013 | 4/1978 | Dornfeld et al. | 74/866 |
| 4,106,367 | 8/1978 | Bouvet et al. | 74/866 |
| 4,125,038 | 11/1978 | Hiramatsu | 74/865 X |
| 4,340,133 | 7/1982 | Blersch | 192/30 W |
| 4,354,236 | 10/1982 | Miki et al. | 74/866 X R |
| 4,440,279 | 4/1984 | Schreiner | 188/1.11 |

Primary Examiner—Dwight Diehl

[57] ABSTRACT

In an automatic transmission gear system which selectively actuates a plurality of frictional elements by oil pressure such as clutches and brakes that are provided in the transmission gear system in order to obtain different gear ratios, one frictional element is disengaged concurrently with engaging of another frictional element for switching the gear ratio (speed change). At that time, it is important to adjust the timing for actuating the frictional elements depending on the conditions of the engine and the vehicle itself. The present invention relates to a control device for an automatic transmission gear system which assures smooth gear shifting at all times by adequately controlling the overlap of the torque capacities of the frictional elements.

5 Claims, 4 Drawing Sheets

CONTROL DEVICE FOR AUTOMATIC TRANSMISSION GEAR SYSTEM

This application is a continuation of application Ser. No. 463,935, filed Jan. 8, 1990; which is a continuation of application Ser. No. 07/267,667 filed Nov. 4, 1988; which is a continuation of application Ser. No. 07/081,586 filed Aug. 3, 1987; which is a continuation of application Ser. No. 06/912,686 filed Sept. 26, 1986; which is a continuation of application Ser. No. 06/530,642 filed Sept. 9, 1983.

BACKGROUND OF THE INVENTION

The present invention relates to an improvement of the control device for an automatic transmission gear system and aims to alleviate the shock caused by gear shifting.

Automatic transmission gear systems used in automobiles are generally capable of selectively actuating a plurality of frictional elements such as clutches and brakes that are provided in the transmission gear system by oil pressure in order to obtain different gear ratios, and for effecting the gear shift, one of the frictional elements is disengaged while another one is engaged.

In an automatic transmission gear system of the above construction, adequate control of timing for disengaging one of the frictional elements and engaging another element is of great importance in alleviating shock due to speed changes and in assuring comfortable driving as well as preventing any damage to the transmission gear system.

For example, if the disengagement occurs too early and the engagement too late, damage occurs during the time between the disengagement and the engagement. On the other hand, if the disengagement occurs too late and the engagement too early, a state of both frictional elements being engaged occurs. This leads to contradictions in a speed change gear assembly and causes damage to the vehicle as a whole as well as putting an excessive load on the frictional elements and the gear systems, thus inducing damage thereto.

Therefore, when the gear ratio of the transmission is changed from lower to higher speed with the engine in a driving state, an overlap of torque capacities of the frictional elements proportional to the output torque of the engine is desirably provided between the disengagement and engagement to prevent the engine from racing; while on the other hand, when the engine is in the driven state, it is preferable to provide a suitable time interval after the frictional element for lower speed driving is released until the rotational speed of the engine decreases enough to accommodate the driving condition at a higher speed. In this way, the frictional elements for higher speed driving can be engaged (the interval is defined as a zero overlap or an overlap of negligible amount).

On the contrary, when the gear ratio of the transmission is changed from higher to lower speed with the engine in a driving state, it is desirable that the timing for disengaging and engaging the frictional elements be controlled corresponding to the driving speed of the vehicle. When the vehicle is running at a higher speed, it is preferable that, after disengaging the frictional element for higher speed driving, a small amount of said overlap be provided to let the rotational speed of the engine increase enough to accommodate the driving condition at a lower speed, before the frictional element for lower speed driving is engaged. As the vehicle slows down, it is necessary to increase the amount of the overlap. Especially at a low speed, it is desirable that the interval is reduced to almost zero, and the overlap increased.

Thus, it is necessary to provide the overlap at lower speeds and reducing it gradually as the vehicle gathers speed. However, if the overlap of the engagement is small when the engine is in a driven state, an interval takes place causing the engine braking effect of the vehicle to be cancelled for a while, and thereafter the frictional element for lower speed driving is engaged causing the vehicle to come under forcible engine braking effect, resulting in impaired comfort of driving.

A one-directional brake instead of ordinary brakes can be used to automatically change such gear ratios, but this cannot be adapted to all of the frictional elements in the transmission. Also, a control device activated by oil pressure can be used which detects the change in the rotational speed of axis of the transmission gear system so that the oil pressure can be supplied without delay to the frictional elements for coupling when synchronization is attained (Jap. Pat. Pub. Sho 54-35631).

SUMMARY OF THE INVENTION

The present invention aims to provide a control device for an automatic transmission gear system which is capable of alleviating the shock at the time of shifting from one gear ratio to another by providing a suitable overlap of the frictional elements dependent on the driving condition of a vehicle when such elements are activated to change the gear ratio.

Another object of the present invention is to provide a control device for an automatic transmission gear system which can reduce the time needed for gear shifting without causing shock.

Still another object of the present invention is to provide a control device for an automatic transmission gear system which can be adapted to a wider range of speeds.

In an automatic transmission gear system which is provided with a speed change gear assembly having plural gear ratios between input and output shafts, a control device according to the present invention to achieve the above objects comprises: a frictional element actuated by oil pressure to obtain a gear ratio for lower speed driving; a frictional element actuated by oil pressure to obtain a gear ratio for higher speed driving; a synchronization detecting means to detect whether said gear ratios have been obtained or not; a switching valve for switching oil passages leading to the frictional elements at a time of shifting between the lower and the higher speed driving; an overlap regulating means to provide an overlap of torque capacities of the frictional elements when gear shifting between the higher and the lower speed; and an electronic control device which controls the oil pressure to be supplied to said overlap regulating means to control the amount of overlap in such a way that, during gear shifting from the higher to the lower speed driving, said amount of overlap is controlled to decrease when engagement of the higher-speed gear ratio is released and that amount of overlap is controlled to increase when engagement of the lower-speed gear ratio is obtained.

BRIEF DESCRIPTION OF THE DRAWINGS

FIG. 1 shows the construction of the power transmission means in schematic view. FIG. 2 shows the construction of the oil pressure control means.

DETAILED DESCRIPTION OF THE EMBODIMENT

The embodiments of the present invention will now be described in detail with reference to the accompanying drawings.

Figure 1:
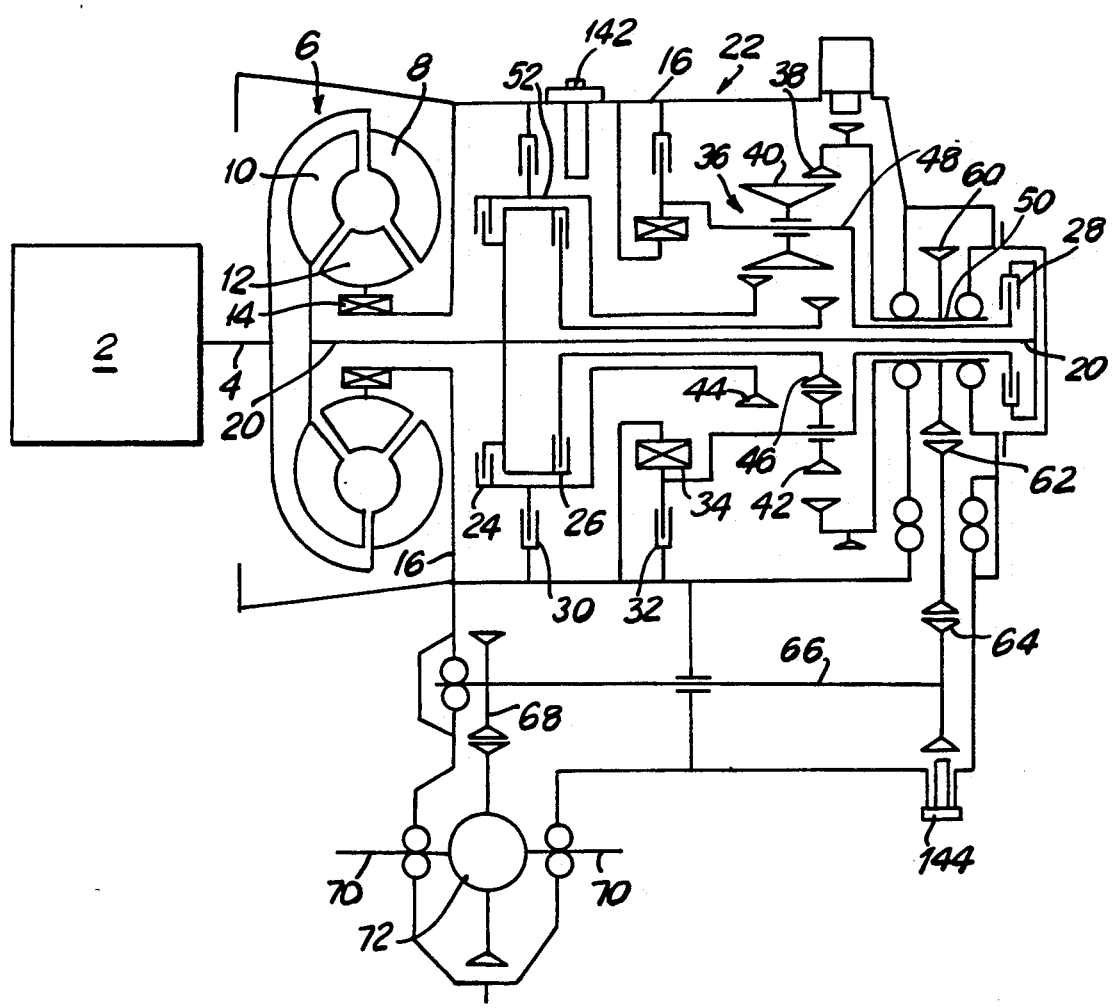
FIGS. 1 and 2 show an automatic transmission gear system to which the device according to the present invention can be adapted.

Referring first to FIG. 1 which shows the construction of an automatic transmission gear system to which the control device according to the present invention is to be adapted, an engine 2 which constitutes the power source for driving the vehicle is provided with a crank shaft 4 which is directly connected to a pump 8 of a torque converter 6. The torque converter 6 comprises the pump 8, a turbine 10, a starter 12, and a one-way clutch 14, and the starter 12 is connected to a case 16 via the one-way clutch 14. The stater 12 is so constructed that it can be rotated in the same direction as the crank shaft 4 but is not permitted to rotate in the reverse direction by means of said one-way clutch 14.

The torque transmitted to the turbine 10 is then transmitted via an input shaft 20 to a speed change gear assembly 22 which is provided behind said turbine 10 and which has four forward speeds and one reverse speed.

Said speed change gear assembly 22 comprises 3 clutches 24, 26 and 28; 2 brakes 30 and 32; one one-way clutch 34, and one ravigneraux type planetary gear set 36. Said planetary gear set 36 comprises a ring gear 38, a long pinion gear 40, a short pinion gear 42, a front sun gear 44, a rear sun gear 46 and a carrier 48 which rotatably supports said pinion gears 40 and 42 and also rotatable itself. The ring gear 38 is coupled to an output shaft 50 and the front sun gear 44 is coupled to the input shaft 20 by means of a kickdown drum 52 and a front clutch 24. The rear sun gear 46 is coupled to the input shaft 20 via a rear clutch 26. The carrier 48 is fixedly coupled to the case 16 via the low reverse brake 32 and the one-way clutch 34 that are arranged so that they are functionally parallel. The carrier 48 is also coupled to the input shaft 20 via the 4th speed clutch provided behind the speed change gear assembly 22. Said kickdown drum 52 can be fixedly coupled to the case 16 by means of the kickdown brake 30. The torque transmitted to the planetary gear set 36 is further transmitted from an output gear 60 fixed to the output shaft 50 to a driven gear 64 via an idle gear 62, and to a differential gear mechanism 72 via a transfer shaft 66 fixed to said driven gear 64 and a helical gear 68, the said differential gear mechanism 72 being coupled to a driving shaft 70.

Figure 2:
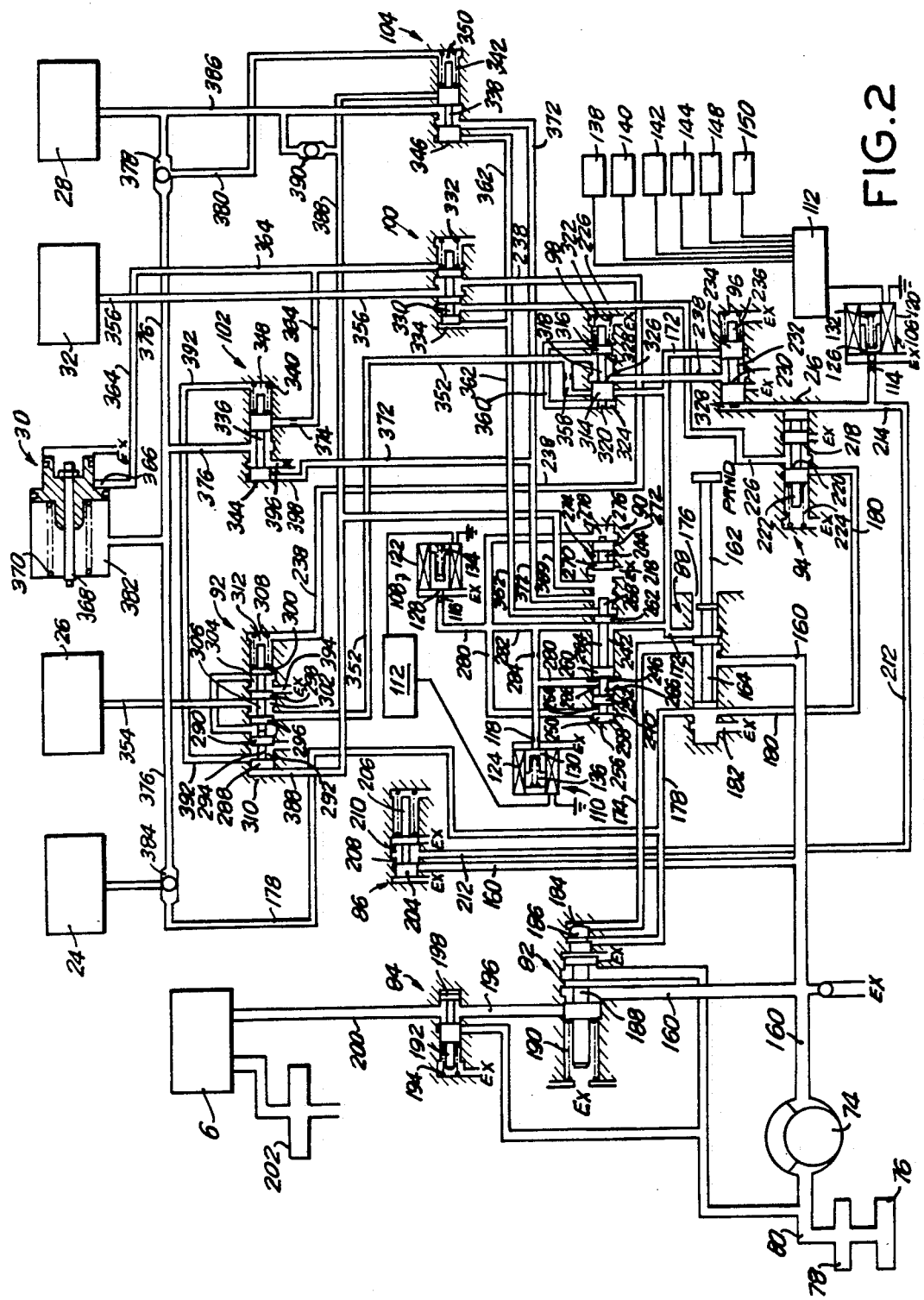

Clutches and brakes mentioned above each comprise a frictional coupling means provided with a piston or servo means for engagement, and are actuated by oil pressure generated at an oil pump 74 which is shown in FIG. 2 and is driven by the engine 2 via the pump 8 of the torque converter 6. Said oil pressure is selectively distributed by means of an oil pressure control device to the clutches and the brakes according to the driving condition of the vehicle which is detected by various detecting means. Appropriate combinations of different clutches and brakes in operation will achieve 4 forward speeds and 1 reverse speed as shown in Table 1. In this Table, the symbol ○ denotes that the clutches or brakes are engaged, and the symbol ● denotes that the rotation of the carrier is locked by the function of the one-way clutch 34 immediately before the low reverse brake 34 is engaged for shifting operation.

TABLE 1

| Frictional Element | Gears | | | | | |
|---|---|---|---|---|---|---|
| | 1st | 2nd | 3rd | 4th | R | N.P. |
| Front Clutch 24 | | ○ | ○ | | ○ | |
| Rear Clutch 26 | ○ | ○ | ○ | | | |
| Kickdown Brake 30 | | ○ | | ○ | | |
| Low Reverse Brake 32 | ○ | | | | ○ | |
| One-way Clutch 34 | ● | | | | | |
| 4th Speed Clutch 28 | | | | ○ | | |

The electronic oil pressure control device which is responsible for achieving the gear shiftings shown in Table 1 in the transmission gear system shown in FIG. 1 will now be described.

The oil pressure control device shown in FIG. 2 controls the oil pressure according to the driving condition of the vehicle. The oil pressure is supplied by an oil pump 74 from an oil sump 76 via an oil filter 78 and an oil passage 80 in order to actuate the piston or servo mechanism of the clutches 24, 26 28 and the brakes 30, 32 respectively, and to the torque converter 6. The control device comprises as the principal components a pressure regulating valve 82, torque converter control valve 84, a pressure reducing valve 86, a manual valve 88, a shift control valve 90, a rear clutch control valve 92, an N-R control valve 94, an oil pressure control valve 96 for gear shifting, an N-D control valve 98, a 1st-2nd speed shift valve 100, a 2nd-3rd speed and 4th-3rd speed shift valve 102, a 4th speed clutch control valve 104 and three electromagnetic valves 106, 108 and 110. These components are connected by means of the oil passages. The shift control valve 90, the 1st-2nd speed shift valve 100, the 2nd-3rd and 4th-3rd speed shift valve 102 and the 4th speed clutch control valve 104 function to switch the oil passages leading to respective frictional elements 24, 26, 28, 30 and 32 for changing the gear ratios.

Said electromagnetic valves 106, 108 and 110 are similar in structure and are of the type which controls the opening and the closing of orifices 114, 116 and 118 by means of electric signals transmitted from an electronic control device 112 and is closed when the electric signals are cut off. Each electromagnetic valve comprises coils 120, 122, 124 and valves 126, 128 and 130 respectively, which are provided inside said coils to switch ON/OFF orifices 114, 116 and 118, and springs 132, 134 and 136 which energize said valves.

The electronic control device 112 contains a means which detects driving state and accordingly decides which one of the electromagnetic valves 108 or 110 is to be closed and opened, and a means to detect the start of gear shifting. The said device 112 controls the ON/OFF of duty control for the electromagnetic valve 106 and also the oil pressure by controlling the valve opening period within one cycle by varying the pulse-width of pulsating electric signal of 50 Hz supplied to the valve 106. The control device 112 further controls the opening/closing of the electromagnetic valves 108 and 110. The input elements of the said device 112 include a detecting means 138 which detects the opening degree of a throttle valve (not shown) of the engine 2 or the negative pressure of the intake manifold, a detection means 140 which detects the rotational speed of the engine, a detecting means 142 which detects the rotational speed of kickdown drum 52 shown in FIG. 1, a detecting means 144 which detects the rotational speed of the driven gear 64 to thereby detect the rotational speed of the output shaft 50, a temperature detection means 146 for detecting the temperature of the lubricant oil, a position detecting means 148 which detects the position of the selector lever and a position detecting means 150 which detects the position of an auxiliary switch.

Pressurized oil discharge from said oil pump 74 is supplied to the oil pressure regulating valve 82, the manual valve 88 and the pressure reducing valve 84 via an oil passage 160.

The manual valve 88 is provided with 4 positions, i.e. D, N, R and P. When the D position is selected, the oil passage 160 connects with oil passages 172 and 174, whereby said speed change gear assembly 22 achieves gear shiftings of 4 forward speeds from the first to the fourth by the ON/OFF combinations of the electromagnetic valves 108 and 110 as shown in Table 2. At the N position, the oil passage 160 connects only with the oil passage 174 while the oil passage 172 is connected to an oil outlet port 176, whereby the speed change gear assembly 22 comes to a neutral state. At the R position, the oil passage 160 connects with oil passages 178 and 180 to allow the speed change gear assembly 22 to come into the reverse driving arrangement. And, at the P position, all the oil passages leading to the manual valve 88 are connected with the oil outlet port 176 or 182 to thereby bring the transmission gear 22 to practically a neutral state.

TABLE 2

| Gears | Solenoid Valve 108 | Solenoid Valve 110 |
| --- | --- | --- |
| 1st | ON | ON |
| 2nd | OFF | ON |
| 3rd | OFF | OFF |
| 4th | ON | OFF |

The pressure regulating valve 82 comprises a spool 188 having pressure receiving surfaces 184 and 186, and a spring 190. As the oil pressure from the oil passage 160 acts on the pressure receiving surface 184 via the oil passage 174, oil pressure in the oil passage 160 is regulated to a predetermined value of 6 kg/cm$^2$ (hereinafter referred to as "the line pressure"). When the oil pressure from the oil passage 160 acts on the pressure receiving surface 186 via the oil passage 178, said oil pressure is regulated to 14.6 kg/cm$^2$.

The torque converter control valve 84, comprising a spool 192 and a spring 194, controls the pressurized oil supplied from the pressure regulating valve 82 via the oil passage 196 to be 2.5 kg/cm$^2$ by balancing the oil pressure acting on the right end surface (as viewed in the drawing) of the spool 192 with the urging force of the spring 194, and supplies the thus regulated oil pressure to the torque converter 6 via the oil passage 200. The oil discharged from the torque converter 6 is supplied to respective lubricating parts of the speed change gear assembly via an oil cooler 202.

The pressure reducing valve 86, comprising a spool 204 and a spring 206, reduces and regulates the oil pressure from the oil passage 160 to be at 2.4 kg/cm$^2$ by balancing the urging force of the spring 206 with the oil pressure caused by the area difference of the opposing pressure receiving surfaces 208 and 210 that are formed in the spool 204, and then supplies the oil pressure to the oil passage 212. Pressurized oil thus regulated (reduced) and supplied to the N-R control valve 94, the oil pressure control valve 96 and the orifice 114 of the electromagnetic valve 106 via the oil passage 212 and an orifice 214.

The N-R control valve 94, which comprises a spool 222 having pressure receiving surfaces 216, 218 and 220 and a spring 224, regulates the oil pressure of the oil passage 226 to a desired value by balancing the oil pressure acting on the surface 216 with the combined force of the oil pressure caused by the area difference of the surfaces 218 and 220 and the urging force of the spring 224.

The oil pressure control valve 96, which comprises a spool 234 having pressure receiving surfaces 228, 230 and 232 and a spring 236, regulates the oil pressure of the oil passage 238 to a desired value by balancing the oil pressure acting on the surface 228 with the combined force of the oil pressure caused by the area difference of the surfaces 230 and 232 and the urging force of the spring 236.

Said oil pressure thus regulated and supplied to the oil passage 226 controls the low reverse brake 32 at the time of shifting the gear to the reverse position. Oil pressure regulated and supplied to the oil passage 238 controls the front clutch 24, the rear clutch 26, the kickdown brake 30 and the low reverse brake 32 when the vehicle is in advance or is at a halt.

The electromagnetic valve 106 is subjected to be duty controlled by the electronic control device 112 by means of pulsating electric signal of 50 Hz whose pulse width is variable depending on the driving condition of the vehicle. By the change of the pulse width, the ON/OFF time of the orifice 114 is controlled so that the oil pressure in the oil passage 212 which is at the downstream of the orifice 214, or in other words the oil pressure $P_1$ which acts on the pressure receiving surface 228 of the oil pressure control valve 96 and the surface 216 of the N-R control valve 94 can be controlled. By controlling said oil pressure $P_1$, oil pressure supplied to respective frictional elements are controlled and controls the engaging action of the respective frictional elements. Also, the oil pressure $P_1$ controls oil pressure supplied to an overlap regulating means which controls the amount of overlap. For example, suppose the diameter of orifice 214 is 0.8 mm and that of orifice 114 is 1.4 mm said oil pressure $P_1$ is regulated within the range of approximately from 0.3 to 2.1 kg/cm$^2$. Accordingly, the regulated oil pressure appearing in oil passages 226 and 238 will vary in proportion to the increase or decrease of said oil pressure $P_1$ within the range of approximately from 0 kg/cm$^2$ to the supplied oil pressure (oil pressure in oil passage 180 or 172).

The timing to start operating the electromagnetic valve 106 and the duration time is determined by the signals transmitted from the detecting means 138 for the engine load, sensors 140, 142 and 144 which detect the rotational speed as well as signals from the gear shift detecting means which detects the start of gear shifting, and the detecting means comprising two sensors 142 and 144 that are contained in the electronic control device 112 to detect the engagement timing.

The shift control valve 90 is controlled by various ON/OFF combinations of the electromagnetic valves 108 and 110, and comprises three spools 240, 242 and 244 and two stoppers 246 and 248, wherein said spool 240 is provided with lands 250 and 252, an annular groove 254 and the oil passage 258 which communicates with an oil chamber 256 located at the left of the land 254 and the annular groove 254 as viewed in the drawing; said spool 242 is provided with lands 260 and 262, each having different diameters, an annular groove 264 and pressing members 266 and 268 which are abut against the spools 240 and 244 respectively; and the spool 244 is provided with lands 270 and 272, an annular groove 274 and an oil passage 278 which communicates with an oil chamber 276 located at the right of the land 272 and the annular groove 274. The stopper 246 is interposed between the spools 240 and 242 and fixed to the casing; the stopper 248 is interposed between the spools 242 and 244 and fixed to the casing. The oil passage 172 connected with an oil passage 280 at all times via the annular groove 264, and said oil passage 280 communicates with the orifice 116, the oil chamber 256 located at the left and the oil chamber 276 at the right via an orifice 282 and also with the orifice 118 and an oil chamber 286 located in between the spools 240 and 242 via an orifice 284.

The rear clutch control valve 92 comprises a spool 294 provided with a land 288 and a land 290 which is smaller in diameter than the land 288 and also an annular groove 292, a spool 306 provided with three lands 296, 298 and 300 which are the same in diameter as the land 288 and annular grooves 302 and 304, and a spring 308. When the pressing force of the oil pressure introduced in an oil chamber 310 at the left as shown in FIG. 2, said pressing force acting on the pressure receiving end surface of the land 288 becomes greater than the combined force of the oil pressure introduced in an oil chamber 312 at the right as shown in FIG. 2 and the pressing force acting on the pressure receiving end surface of the land 300 and the urging force of the spring 308 causes the spools 294 and 306 to move toward the right end as in the drawing. When the spools are situated at the right end, the oil pressure acts in between the lands 290 and 296, so that the spool 294 alone moves toward the left end as the oil pressure in the oil chamber 310 is released. When the oil pressure acting on the left end of the pressure receiving surface 296 becomes less than the combined force of the oil pressure in said oil chamber 312 and the urging force of the spring 308, it then causes the spool 306 to move toward the left.

The N-D control valve 98 which comprises a spool 320 provided with lands 314, 316 and an annular groove 318, and a spring 322, selectively switches the position of the spool 320 between the left end as shown in FIG. 2 and the right end (not shown) of the valve 98 in accordance with the direction of the combined forces of the oil pressure acting on the pressure receiving surfaces of the spool 320 with the urging force of a spring 322.

The 1st-2nd speed shift valve 100 which comprises a spool 330 and a spring 332, switches the position of said spool 330 between the left end as indicated in FIG. 2 and the right end (not indicated) by suitably supplying or releasing the line pressure which acts on a pressure receiving surface 334 of the left end of the spool 330.

When the line pressure is so supplied to act on the surface 334, the spool 330 is caused to move toward the right by the line pressure, whereas when the line pressure is exhausted, it will be pressed toward the left end by the force of the spring 332.

The 2nd-3rd and 4th-3rd speed shift valve 102 and the 4th speed clutch control valve 104 also comprise spools 336 and 338 and springs 340 and 342 respectively. At the left of the respective spools 336 and 338 are the oil pressure chambers 344 and 346 to which the line pressure is introduced and at the right are the oil chambers 348 and 350 respectively. Thus, the respective spools will be selectively switched between the left end as indicated in FIG. 2 and the right end not indicated.

Now the functions of the oil pressure control device will be described in conjunction with the gear shift control. As for the conventional gear shift control, details thereof will be omitted as it is well known in the art (Jap. Pat. Appln. No. Sho 56-144237).

First, the concept of overlap which is of critical significance in the present invention will be explained.

Suppose that the torque capacity of the frictional element which determines the lower-speed gear ratio is expressed as $T_1$, that of the frictional element which determines the higher-speed gear ratio as $T_2$, with constants $a_1$, $a_2$ such as the piston area of each frictional element, the number of clutch plates, radius of clutches and coefficient of friction, then the amount of overlap C can be expressed by the following equation:

$$C = a_1 T_1 + a_2 T_2$$

Figure 3A:
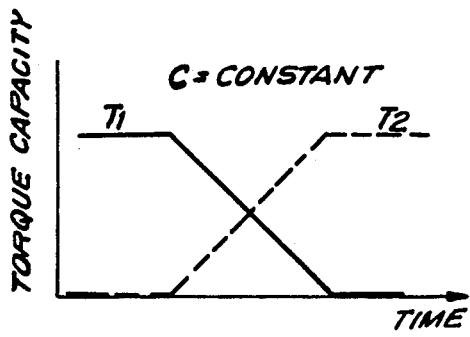
FIGS. 3(a) and 3(b) are graphs explaining the amount of overlap respectively.
Figure 3B:
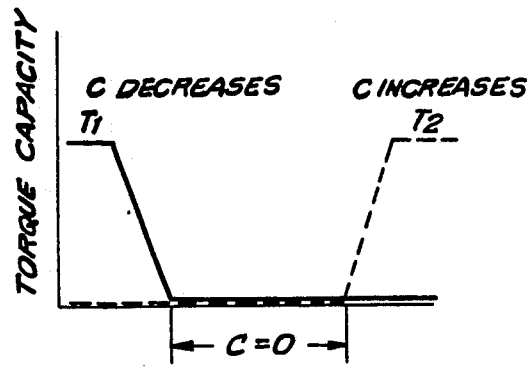
Figure 4:
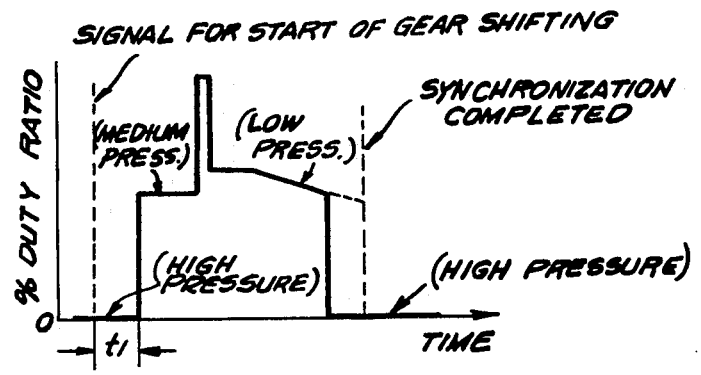
FIGS. 4 and 7 are graphs explaining oil pressure control at the time of speed changes.

Thus, by varying the oil pressure supplied to the respective frictional elements, the value of $T_1$ or $T_2$ can be varied to thereby change the amount of overlap C. FIG. 3(a) shows a case where the shift takes place with the amount of overlap C at a constant level, whereas FIG. 3(b) shows a case where the shift takes place with the amount of overlap C varied.

The first embodiment of the present invention will be described with respect to the 3rd-2nd speed downshift. Referring again to FIG. 2, an oil chamber 382 of the kickdown brake 30 (the frictional element for obtaining the lower-speed gear ratio) is connected with the oil pressure chamber of the front clutch 24 (the frictional element for determining the higher-speed gear ratio) via an oil passage 376 thus constitutes the overlap regulating means. In order to disengage the 3rd speed, therefore, it is necessary to exhaust the pressurized oil supplied to the front clutch. For this, it is necessary to lower the pressure of oil to be supplied to an oil chamber 366 of the kickdown brake 30 and reduce the oil to be pumped out from an oil chamber 382 of said brake 30, and at the same time the 2nd-3rd speed and 4th-3rd speed shift valve 102 must be moved toward the 2nd speed position (at the left end as shown in FIG. 2). When, however, the oil supplied to the chamber 366 of the kickdown brake 30 is maintained at a lower pressure, the kickdown brake 30 is not ready for engagement and even if the pressure is elevated as soon as synchronization of the 2nd speed is completed, the kickdown brake 30 will not be engaged in time. Thus, it becomes necessary to supply high pressure oil until the brake piston moves and preparation for engaging is completed. But, if high pressure oil is continuously supplied, the engaging force becomes great so rapidly at the engagement of the kickdown brake 30 and the front clutch 24 disengaging at the same time resulting shock.

Now, as the output signal indicating the start of gear shifting from 3rd to 2nd speed is transmitted from the electronic control device 112 according to the various input signals which represent the driving condition of the vehicle, the electromagnetic valve 108 will be de-energized while the electromagnetic valve 110 will be energized. Because the oil pressure in the oil passage 372 is exhausted by the function of the shift control valve 90, the spool 336 of the 2nd-3rd and 4th-3rd speed shift valve 102 is moved toward the left. Then the oil passage 376 communicates with an exhaust port 396, causing the oil pressure in an oil chamber 350 of the 4th speed clutch control valve 104 to exhaust via a check valve 378 and the oil passage 380. So, the spool 338 of said 4th speed clutch control valve 104 moves to the right, causing the oil pressure of the clutch 28 to exhaust via the oil passage 386, 388 and the clutch 28 is disengaged. At the same time the duty ratio of the electromagnetic valve 106 is controlled by the electronic control device 112 as the signal indicating the start of gear shifting is transmitted. The control is carried out in such a way that the oil pressure to be supplied from the oil pressure control valve 96 to the oil chamber 336 of the kickdown brake 30 via the 1st-2nd speed shift valve 100 and the oil passage 364, be supplied at a higher pressure (line pressure) for a predetermined time $t_1$ until the brake piston will have been moved and ready for engaging, said time $t_1$ being predetermined from the supply oil pressure and the volume of the oil chamber 366 of the kickdown brake 30. This causes the piston in the kickdown brake 30 to move rapidly, and the oil in the oil chamber 382 is rapidly exhausted to the oil passage 376. Since exhaustion of the oil in the front clutch 24 is delayed, this will maintain the torque capacity of said clutch 24 and hold the overlap c to a large amount. After the predetermined time $t_1$ elapses, the duty ratio for the electromagnetic valve 116 is increased to obtain a medium pressure while maintaining the kickdown brake 30 ready for full engagement. As a result, the oil pressure in the front clutch 24 can be exhausted without being impaired by the exhaust oil from the oil chamber 382 of the kickdown brake 30 to thereby cause the 3rd speed gear to be disengaged. This disengagement of the 3rd-speed gear is detected by comparing the signals from the detecting means 142 which detects the rotational speed of the kickdown drum 52 and the detecting means 144 which detects the rotational speed of driven gear 64. Said detecting means 142, 144 function as a part of the synchronization detecting means. By means of the signal which indicates the disengagement of the 3rd speed gear, the oil pressure to be supplied to the kickdown brake 30 will be promptly reduced to thereby decrease the torque capacity of the front clutch 24 and thus the amount of overlap C, so that the change speed transmission assembly 22 will practically be in the neutral state in which the amount of overlap C is reduced to 0 (a state wherein the torque capacity of the two frictional elements 24 and 30 respectively becomes 0 to permit a time interval). Synchronization of the 2nd speed is detected by the signals from said rotational speed detecting means 142 and 144. (In this case, synchronization of the 2nd speed can be detected by detecting the time when the rotational speed of the kickdown drum 52 becomes zero.) By the signal indicating the synchronization of the 2nd speed, the oil pressure to be supplied to the kickdown brake 30 is promptly switched from lower to higher pressure, and the amount of overlap C is increased from 0 to a higher value by increasing the oil pressure for engaging the kickdown brake 30 which is the frictional element for the 2nd speed. Thus, the gear shifting from the 3rd to the 2nd speed is completed. It is to be noted that synchronization is deemed complete when approximately 300 rpm before synchronization is obtained considering the delay in increasing the low oil pressure to a higher value after the synchronization of the 2nd speed is detected.

As has been mentioned above, by regulating the amount of overlap C of the kickdown brake 30 and the front clutch 24 by controlling the duty ratio of the electromagnetic valve 106 by means of the electronic control device 112, the kickdown brake 30 will be smoothly engaged without shock, whereby the gear shifting from 3rd to 2nd speed is achieved.

In the above embodiment, the oil pressure is varied high→medium→low→high, but it is possible to vary the pressure high→low→high, skipping the medium range However, the time required for gear shifting can be shortened by providing the medium pressure range. This applies not only to the downshift (gear change) from 3rd to 2nd speed, but also to the downshift from the 4th to 3rd speed, in which case the engagement-/disengagement of the kickdown brake 30 and the front clutch is reversed.

The second embodiment of the present invention will now be explained with respect to the downshift from the 3rd to 2nd speed. The embodiment is almost identical in construction with the first embodiment except that a stroke detecting means 400 is provided to detect the stroke position of an oil pressure piston rod 368 in order to directly detect whether the kickdown brake 30 is ready for engagement.

Figure 5:
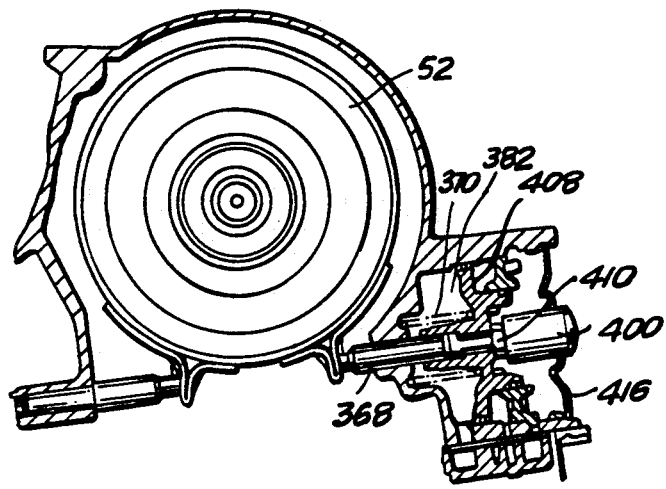
FIGS. 5, 6(a) and 6(b) show the stroke detection means, with FIG. 5 showing the same in cross section and FIGS. 6(a) and 6(b) showing the essential parts in enlarged sectional views respectively.
Figure 6A:
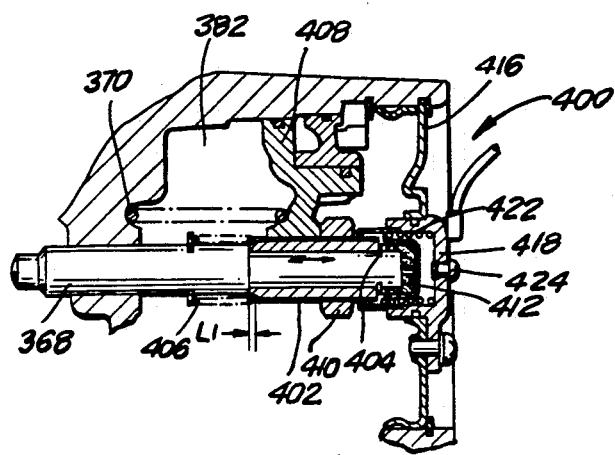
Figure 6B:
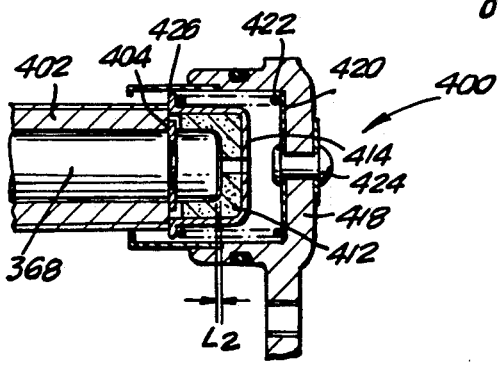

The stroke detecting means 400 is attached to the base of the rod 368, as shown in FIGS. 5, 6(a) and 6(b), to which the oil pressure piston of the kickdown brake 30 is fixed. A stepped portion is formed at the base of the rod 368, and a sleeve 402 which is made of a conductive material such as stainless steel and formed about 1 mm shorter than the stepped portion, is slidably mounted on the outer circumference of the stepped portion and retained to the rod 368 by means of a retaining ring 404 in such a manner that it will have a stroke $L_1$ of this 1 mm difference. The sleeve is also urged toward the right in FIG. 6(a) by means of a spring 406. An oil pressure piston 408 is fixedly screwed to the threaded portion at the outer circumference of the sleeve 402 by means of a nut 410, and the spring 370 is interposed between said oil pressure piston 408 and the wall of the oil chamber 382. On the other hand, an insulating cap 412 made of an insulating material, such as resin is attached to the base of the rod 368. A spring 422 is interposed between a stopper 414 made of stainless steel which caps on the insulating caps 412 and a stainless washer 420 attached to the inner side of a resin mold cap 418 which attached to a cover 416. The arrangement is such that when the sleeve 402 is pressed toward the right by means of the spring 406 as shown in FIG. 6(b), there is formed gap $L_2$ of approximately 0.1 to 0.4 mm between the rod 368 and the insulating cap 412. When a terminal 424 provided at the center of the cap 418 is connected to the power source under the condition as shown in FIG. 6(b), an electric circuit connecting the terminal 424, the washer 420, the spring 422, the stopper 414, a contact point 426, the sleeve 402, the oil pressure piston 408 and the spring 370 is formed if the oil pressure piston is at its normal position. On the other hand, if the oil pressure piston 408 is pressed by the pressurized oil supplied to the oil chamber 366 at, the rod 368 is caused to shift its position without contracting the spring 406 which presses the sleeve 402 until just before the engagement of the kickdown brake 30. As the resistance against the movement of the rod 368 increases just before engagement, the oil pressure piston 408 inevitably moves for a distance of stroke $L_1$ while causing the spring 406 to contract As a result, the stopper 414 is permitted to move only for a distance of the gap $L_2$ because of the insulating cap 412 at the contact point 426 of the stopper 414 and the sleeve 402. This causes the contact point 426 to be left open, and the electric circuit will not be completed.

Thus, according to the present invention, the position of the kickdown brake 30 just before the engagement can be electrically detected. It should be noted that the gap $L_2$ can be formed between the retaining ring 414 and the insulating cap 412.

Figure 7:
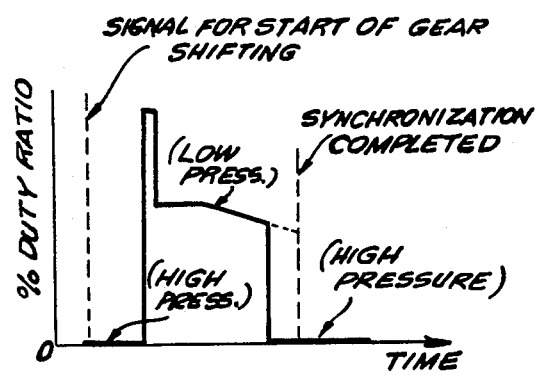

So, when a signal for the gear shifting from 3rd to 2nd speed, based on the signals representing the driving condition of the vehicle, is transmitted from the electronic control device 112, the electromagnetic valve 108 is subsequently de-energized and the electromagnetic valve 110 is energized, whereby the oil pressure in the oil passage 372 is exhausted by the function of the shift control valve 90. As a result, the spool 336 of the 2nd-3rd and 4th-3rd speed shift valve 102 is moved toward the left in FIG. 2. Then the oil passage 376 communicates with the exhaust port 396, causing the oil pressure in the oil chamber 350 of the 4th speed clutch control valve 104 to exhaust via the check valve 378 and the oil passage 380. So, the spool 338 of said 4th speed clutch control valve 104 moves to the right, causing the oil pressure of the clutch 28 to exhaust via the oil passage 386, 388, and the clutch 28 is disengaged. At the same time, the duty ratio of the electromagnetic valve 106, is controlled by the electronic control device 112 as the signal indicating the start of gear shifting is transmitted as indicated in FIG. 7, so that the oil pressure to be supplied from the oil pressure control valve 96 to the oil chamber 366 of the kickdown brake 30 via the oil passage 238, the 1st-2nd speed shift valve 100 and the oil passage 364 is first maintained high. This causes the piston in the kick-down brake 30 to move rapidly, and the oil in the oil chamber 382 is rapidly exhausted to the oil passage 376. Since exhaustion of the oil in the front clutch 24 is delayed, this will maintain the torque capacity of said clutch 24 and hold the overlap c to a large amount. As soon as the oil pressure piston 408 of the kickdown brake 30 shifts itself to the position just before engagement and the OFF signal is transmitted from the stroke detecting means 400, the oil pressure is reduced to decrease the amount of overlap C. Then the pressurized oil of the front clutch 24 is exhausted from the oil passage 376 under this condition to disengage the 3rd speed. Subsequently, the neutral state with the amount of overlap C=0 will follow before the complete synchronization of the 2nd speed is detected by the signals from the rotational speed detecting means 142 and 144 which also function as a part of the synchronization detecting means. By the signal indicating the synchronization of the 2nd speed, the low pressure oil which is supplied to the kick-down brake 30 to be promptly elevated to thereby increase the amount of overlap C. This permits the kickdown brake 30 to be engaged, and the gear shifting from 3rd to 2nd speed is completed.

It should be noted that considering the time delay actually to increase the oil pressure after the synchronization of the 2nd speed is detected, synchronization is deemed complete when approximately 300 rpm before synchronization is obtained.

In this second embodiment, the electronic control device 112 controls the duty ratio of the electromagnetic valve 106 in such a way that high oil pressure is supplied to the chamber 366 of the kickdown brake 30 until just before said brake 30 is engaged and that as soon as an OFF signal is transmitted from the stroke detecting means 400, the pressure of the oil to be supplied to the kickdown brake 30 is lowered to thereby decrease the amount of overlap C. Upon completion of synchronization of the 2nd speed, the oil pressure supplied to the kickdown brake 30 is promptly elevated to thereby increase the amount of overlap C and to regulate the torque capacity to correspond with that of the frictional element with the gear ratio for 2nd speed driving. Thus, the second embodiment can reduce the time required before the start of effective gear shifting when shifting from 3rd to 2nd speed, compared to the above-mentioned first embodiment, and still enables smooth gear shifting without causing shock. The second embodiment also enables to shift down again from 3rd to 2nd speed during the gear shifting up from 2nd to 3rd speed, even if the position of the piston provided in the kickdown brake 30 is unsettled, whereas in the first embodiment one must wait until a predetermined time $t_1$ elapses for effective shifting down.

The third embodiment of the present invention will now be explained. This embodiment is almost identical in construction with the second embodiment except that the control mechanism of the electronic control device 112 is different. This embodiment is effective for engaging the kickdown brake 30 at the time of gear shifting from 1st to 2nd or 3rd to 4th speed.

The embodiment will now be explained in detail with respect to the gear shifting from 1st to 2nd speed in the automatic transmission system as shown in FIGS. 1 and 2.

When the accelerator pedal is stepped on under 1st gear driving and the vehicle gathers speed, a command signal to achieve 2nd speed is transmitted from the electronic control device 112 in response to the signals from the sensor 138 which detects the opening angle of the throttle valve and the sensor 144 which detects the rotational speed of gears, (i.e. the driving speed of the vehicle). The electromagnetic valve 108 will be de-energized and the electromagnetic valve 110 will be continuously energized. By this switching, the line pressure in the oil passage 280 will be supplied to the oil chamber 256 via the orifice and the oil passage 258, and also supplied to the oil chamber 276. The spool 240 will then move toward the right integrally with the spool 242 and stop as the spool 240 abuts against the stopper 246. The line pressure in the oil passage 172 will then be supplied to the oil passage 362 via the annular groove 264 to act on the pressure receiving surface 334 of the 1st-2nd speed shift valve 100 and on the pressure receiving surface 346 of the 4th speed clutch control valve 104. As a result, the spools 330 and 338 of respective valves 100 and 104 are caused to move toward the right end and the line pressure in the oil passage 238 will be supplied via the oil passage 364 to the oil chamber 366 of the kickdown brake 30 to move the rod 368 toward the left in resistance to the spring 370 to thereby engage the brake band (not shown) with the kickdown drum 52. On the other hand, the oil pressure in the oil passage 356 is discharged via the oil passage 226 and release the low reverse brake 32, and the 2nd speed is obtained.

At the time of the engagement of the kickdown brake 30, the duty ratio of the electromagnetic valve 106 is controlled by means of the electronic control device 112 by using the stroke detecting means 400, in such a way that the oil pressure in the oil passage 238 (the oil pressure to be supplied to the oil chamber 366 of the kickdown brake 30) is first maintained at the line pressure which is higher and reduced during gear shifting after a signal from the stroke detecting means 400 is obtained, in order to prevent shock.

Supplying high pressure oil until immediately before the engagement of the kickdown brake 30 reduces the time lag in engagement and thus shortens the time required for shifting without causing shock.

Gear shifting from 3rd to 4th speed also involves engagement of the kickdown brake 30. It is again possible to reduce the time lag and also the shock by supplying higher pressure oil until just before the brake 30 is engaged.

With regard to the stroke detecting means 400, there is no need to make any adjustment even if some parts such as the brake band are worn as long as the stroke detecting means 400 is constructed to always maintain the constant relation between the stroke $L_1$ and the gap $L_2$. It is to be noted, however, that other stroke detecting means such as a potentiometer can be used to directly detects the position of the rod 368.

As has been described in the foregoing by way of embodiments, the present invention is capable of reducing shock caused by gear shifting by controlling the oil pressure to be supplied to the frictional elements by an electronic control device. The construction is simple compared with other control devices of the oil pressure type.

Because the frictional elements, which are switched in accordance with the changes in the gear ratios, are actuated by a suitable overlap of torque capacities depending on the condition of the vehicle, shocks caused by such shifting can be alleviated. Further, since it enable to reduce the time which elapses from the start of the gear shifting to the beginning of the effective gear shifting, smooth and shockless shifting can be obtained without requiring a long overall time.

In each of the foregoing embodiments, the overlap regulating means was constituted by connecting the front clutch 24 and the oil chamber 382 to which the oil pressure is supplied when disengaging the kick-down brake 30, with the oil passage 376. But a hydraulic circuit without said oil passage 376 can be obtained by interposing a timing valve 31, as shown in the U.S. Pat. No. 3,832,915, in said hydraulic circuit and supply the oil pressure from the electric control device of the present invention to the port 63 of said timing valve 31, obtaining same effect as that of the present invention.

What we claim is:

1. A control device for an automatic transmission gear system having a change speed gear assembly with plural gear ratios between an input shaft and an output shaft, comprising:

first frictional element means actuated by fluid pressure to obtain one of said gear ratios for lower speed driving;

an actuating means for actuating said first frictional element means, having first fluid chamber means to which fluid pressure is supplied to activate said first frictional element means, and second fluid chamber means from which fluid proportional to fluid pressure supplied to said first fluid chamber is exhausted;

second frictional element means actuated by fluid pressure to obtain another one of said gear rations for high speed driving;

third fluid chamber means to which fluid pressure is supplied to activate said second frictional element means;

a fluid passage which connects said second fluid chamber means with said third fluid chamber means;

an exhaust passage for exhausting fluid from said fluid passage and connected to said fluid passage when shifting from higher to lower speed driving;

an orifice with an unchangeable opening provided in said exhaust passage for regulating amount of fluid to be exhausted;

a synchronization detection means for detecting whether said gear ratios have been obtained;

switching valves for switching fluid passages leading to said frictional element means at a time of shifting between higher and lower speed driving;

a fluid pressure regulating means, having a fluid pressure control solenoid valve, for controlling sum of transmittable torque of said first and second frictional element means by modulating the fluid pressure supplied to said first fluid chamber means during shifting from higher to lower speed driving;

an electronic control device for controlling said fluid pressure control solenoid valve to control said sum of transmittable torque in such a way that, said sum of transmittable torque is decreased when disengagement of the second frictional element means is detected by said synchronization detection means and said sum of transmittable torque is increased when engagement of the first frictional element means is detected by said synchronization detection means.

2. A control device for an automatic transmission gear system as claimed in claim 1, wherein said synchronization detection means has two sensor means for detecting rotational speed of two arbitrary rotational elements among plural rotational elements of said change speed gear assembly.

3. A control device for an automatic transmission gear system as claims in claim 2, wherein said change speed gear assembly is a ravigneaux-type planetary gear mechanism, and said two arbitrary rotational elements are a sun gear which becomes a reaction force element when said lower-speed gear ratio is obtained, and an annulus gear connected to the output shaft.

4. A control device for an automatic transmission gear system having a change speed gear assembly with plural gear ratios between an input shaft and an output shaft, comprising:

first frictional element means actuated by fluid pressure to obtain one of said gear ratios for lower speed driving;

an actuating means for actuating said first frictional element means, having a fluid pressure operated piston, a first fluid chamber on one side of said piston to which fluid pressure is supplied to activate said first frictional element means, and a second fluid chamber on another side of said piston from which fluid proportional to fluid pressure supplied to said first fluid chamber is exhausted;

second frictional element means actuated by fluid pressure to obtain another one of said gear ratios for higher speed driving;

a third fluid chamber to which fluid pressure is supplied to actuate said second frictional element means;

a fluid passage which connects said second fluid chamber with said third fluid chamber;

an exhaust passage for exhausting fluid from said fluid passage when shifting from higher to lower speed driving;

an orifice with an unchangeable opening provided in said exhaust passage for regulating amount of fluid to be exhausted;

a synchronization detection means for detecting whether said gear ratios have been obtained;

switching valves for switching fluid passages leading to said frictional element means at a time of shifting between higher and lower speed driving;

a fluid pressure regulating means, having a fluid pressure control solenoid valve for controlling sum of transmittable torque of said first and second frictional element means by modulating the fluid pressure supplied to said first fluid chamber during shifting from higher to lower speed driving;

a stroke detecting means for detecting a stroke position of said fluid pressure operated piston;

an electronic control device for controlling said fluid pressure control solenoid valve to control said sum of transmittable torque in such a way that, said sum of transmittable torque is decreased by reducing said fluid pressure supplied to said first fluid chamber until said stroke detecting means detects that the piston is in the position just about to engage the first frictional element means during gear shifting from higher to lower speed driving, and said sum of transmittable torque is increased when engagement of the first frictional engagement element means is detected by said synchronization detection means.

5. A control device for an automatic transmission gear system as claimed in claim 4, wherein said change speed gear assembly is a ravigneaux-type planetary gear mechanism, and said synchronization detection means having means for detecting a rotational speed of a sun gear which becomes a reaction force element when said lower-speed gear ratio is obtained.

* * * * *